UNITED STATES PATENT OFFICE.

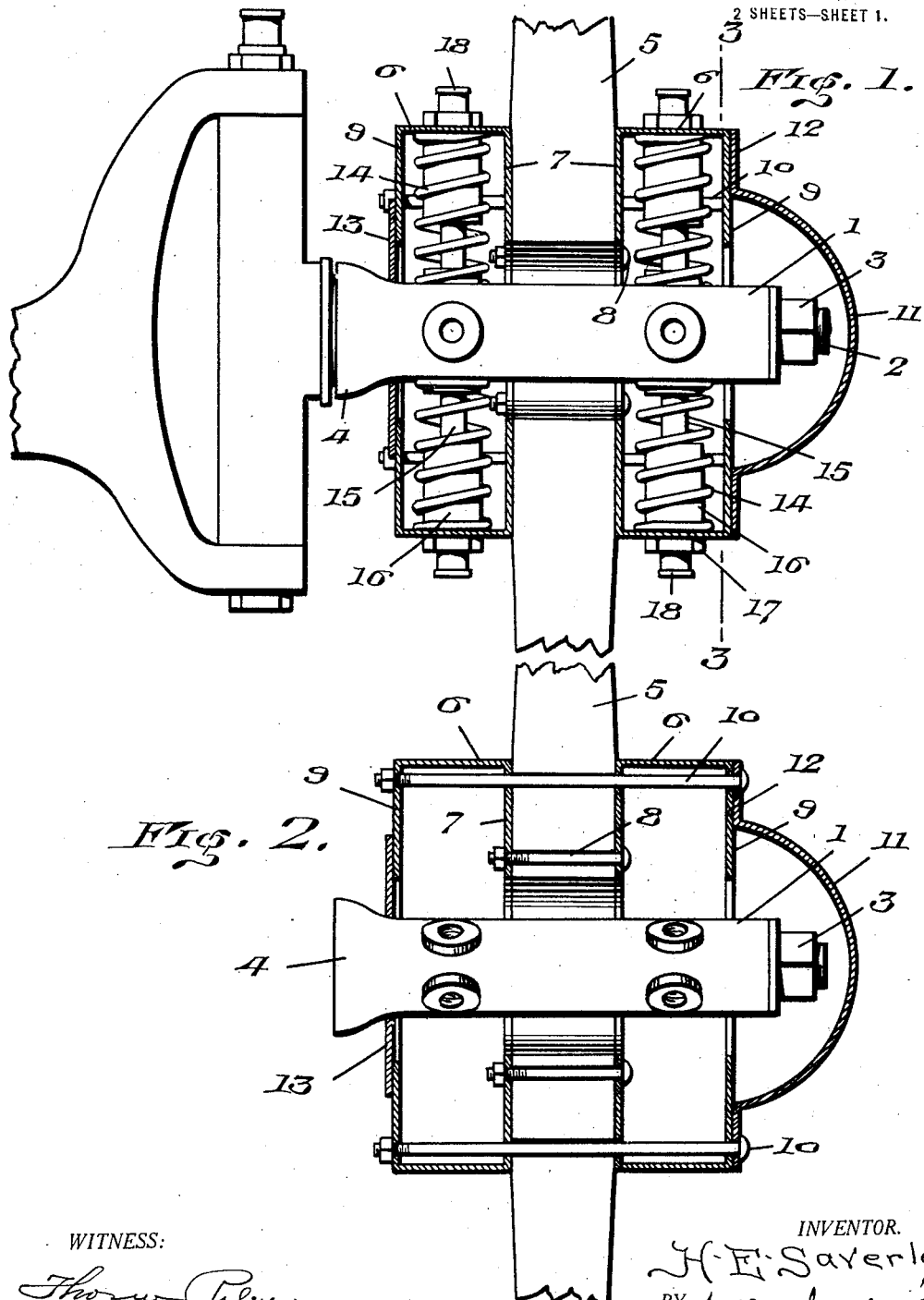

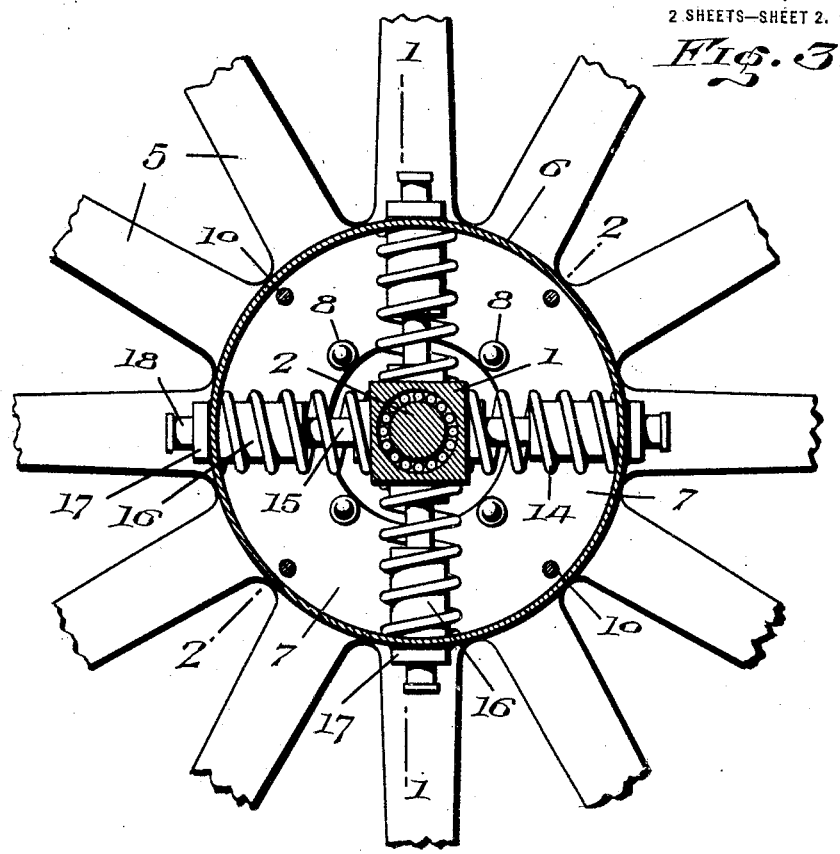
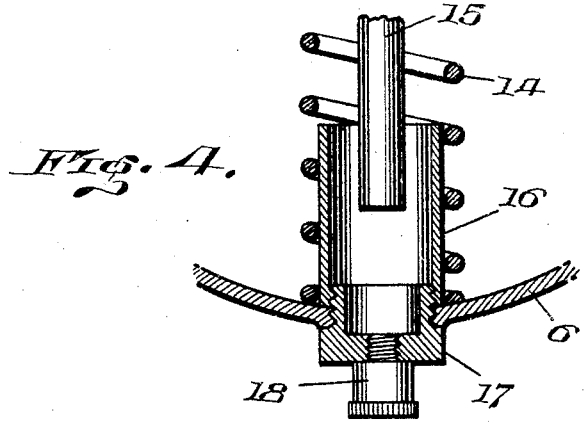

HENRY E. SAVERLEY, OF LONDON MILLS, ILLINOIS.

SPRING HUB.

1,404,409.   Specification of Letters Patent.   Patented Jan. 24, 1922.

Application filed March 4, 1919. Serial No. 280,676.

*To all whom it may concern:*

Be it known that I, HENRY E. SAVERLEY, a citizen of the United States, residing at London Mills, in the county of Fulton and State of Illinois, have invented certain new and useful Improvements in Spring Hubs; and I do hereby declare the following to be a full, clear, and exact description of the invention, such as will enable others skilled in the art to which it appertains to make and use the same.

The present invention relates to a spring hub for use on automobile and other vehicle wheels, and aims to provide a novel and improved construction of that character giving the wheel the required resiliency without the use of the ordinary pneumatic tire.

The object of the invention is the provision of a hub construction including a novel arrangement and construction of parts between the spokes of the wheel and the spindle or axle, providing for resiliency, as well as rendering the construction comparatively simple and inexpensive and also serviceable and efficient.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a diametrical section of the construction taken on the line 1—1 of Figure 3, portions being shown in elevation.

Figure 2 is a section on the line 2—2 of Figure 3, portions being removed for sake of clearness.

Figure 3 is a cross section taken on the line 3—3 of Fig. 1.

Figure 4 is an enlarged sectional detail showing the means for supporting one of the coiled springs.

The hub embodies a sleeve 1 forming the hub proper, which is mounted for rotation on the spindle 2 of the axle or steering knuckle whichever is the case, and this sleeve 1 is retained on the spindle 2 by means of a nut 3 or the like. The inner end of the sleeve 1 is enlarged, as at 4, to surround the inner end of the spindle, and provides a dust and moisture tight joint, and rollers or balls can be provided between the sleeve 1 and spindle to reduce friction, as seen in Figure 3.

The spokes 5 of the wheel which surround and radiate from the sleeve 1 are secured between a pair of opposite rings 6 provided at their adjacent edges with inturned annular flanges 7 bearing against the opposite sides of the spokes at the inner ends thereof, and bolts 8 to engage through said flanges 7 and the spokes for clamping said parts firmly together. The inner ends of the spokes and edges of the flanges 7 are spaced from the sleeve 1 to permit said spokes and sleeve to move relatively in the plane of the wheel. The opposite edges of the rings 6 are provided with similar inturned annular flanges 9 and bolts 10 extend through the flanges 9 and also through the flanges 7 and spokes 5 to assist in clamping the parts together. A cap 11 is disposed over and around the outer end of the sleeve 1 and spindle to keep out the dust, moisture and dirt, and said cap has an outstanding marginal flange 12 bearing against the flange 9 at the outside of the wheel and clamped in place by the bolts 10 as seen in Figure 2. This prevents dust and other foreign matter from entering the casing formed by rings 6, and to keep the dirt and moisture out from the inner end, an annular plate 13 is fitted on the sleeve 1 and bears slidably against and overlaps the flange 9 at the inner side of the wheel, so as to close the opening surrounded by said flange, and permit the sleeve and casing to move relatively.

Coiled wire expansion springs 14 are disposed and confined between the rings 6 of the hub casing and the sleeve or boxing 1, to absorb the shocks, and permit of the required resiliency. These springs 14 are arranged radially at opposite sides of the spokes and flanges 7 within the rings 6, with their inner ends bearing against the sleeve 1 and the outer ends bearing against the rings. To assist in supporting the springs and guiding the parts, outwardly projecting radial rods or fingers 15 are secured to the sleeve 1 and project within the springs 14 into tubular socket members or cups 16 disposed within the outer end portions of the springs, and secured to the rings 6 by means of plugs 17 engaging inwardly through said rings and screwed into the outer ends of the members 16. The springs 14 fit snugly around the members 16, thereby retaining the springs in place, the inner convolutions of the springs embracing studs on the sleeve 1. The rods or fingers 15 can slide and move within the members 16, to thus assist in guiding the parts and retaining them in operative position, as well as transmitting the power from the sleeve 1 to the spokes when the hub is used on a driving wheel. Lubricant cups 18 are preferably attached to the plugs 17 for slowly feeding grease or other lubricant to the interior of the members 16 so that when the fingers 15 bear against the interior walls of the members 16, this will lubricate the parts and reduce friction and wear.

Having thus described the invention, what is claimed as new is:—

A vehicle wheel embodying a hub sleeve, spokes surrounding said sleeve, a pair of rings secured to the spokes at the opposite sides thereof, screw plugs extending inwardly through said rings at the opposite sides of the spokes, tubular socket members threaded on said plugs within said rings and clamping said plugs and members to said rings, radial fingers carried by said sleeve and extending loosely within said socket members for movement longitudinally and laterally of themselves in said socket members, coiled expansion springs surrounding said socket members and confined between said rings and sleeve, and lubricant cups carried by said plugs on the exterior of said rings.

In testimony whereof I have signed my name to this specification in the presence of two subscribing witnesses.

HENRY E. SAVERLEY.

Witnesses:
LEWIS O. GRAY,
THOMAS O. GRIMM.